UNITED STATES PATENT OFFICE.

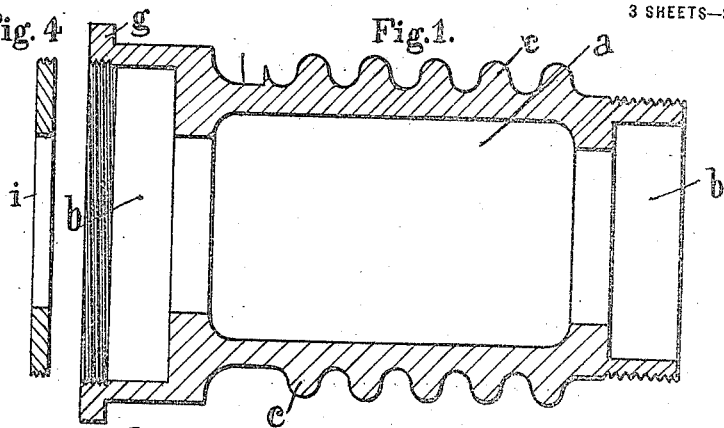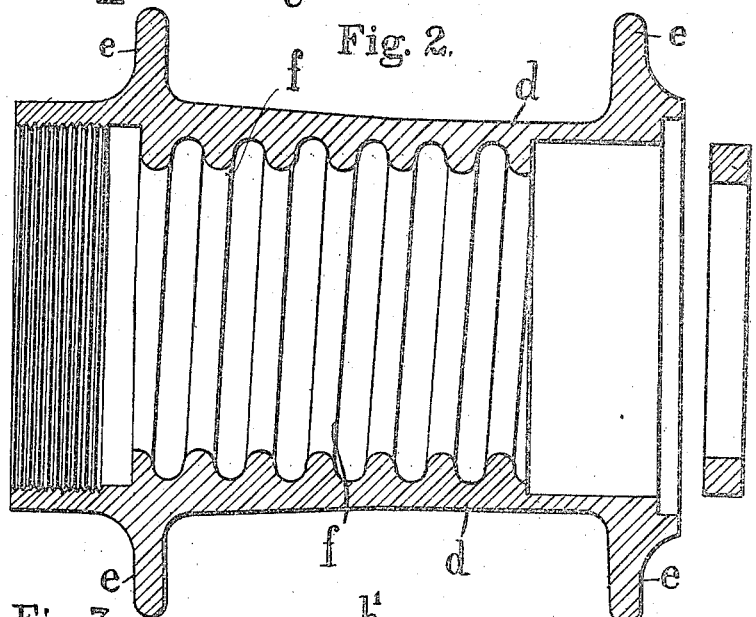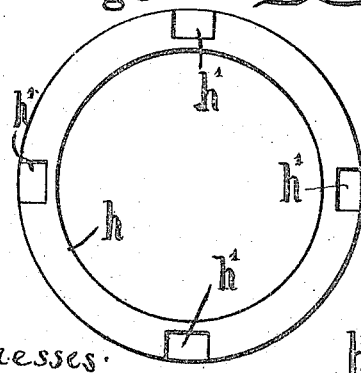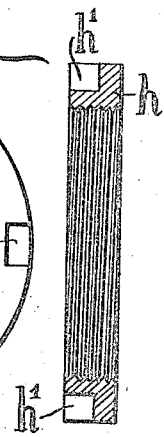

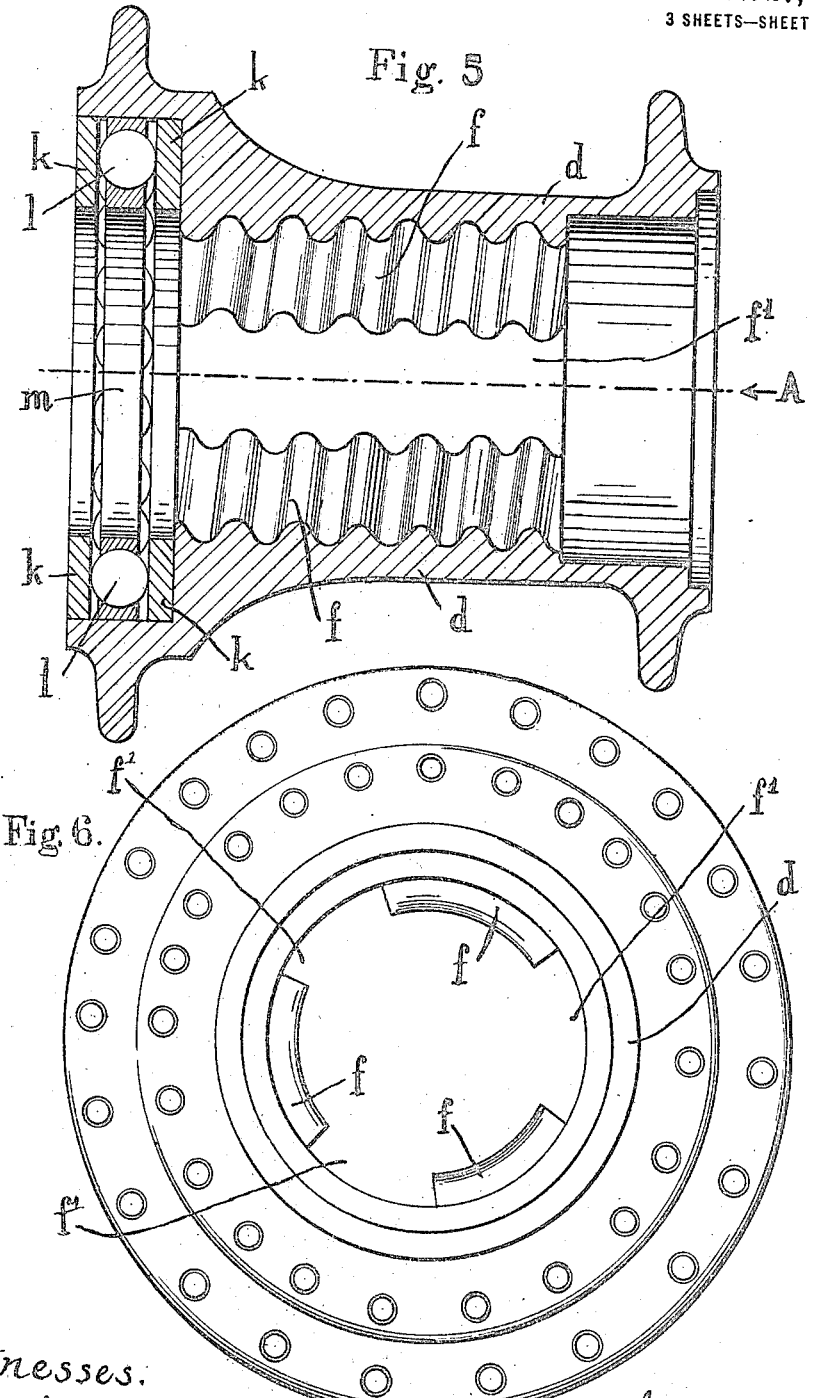

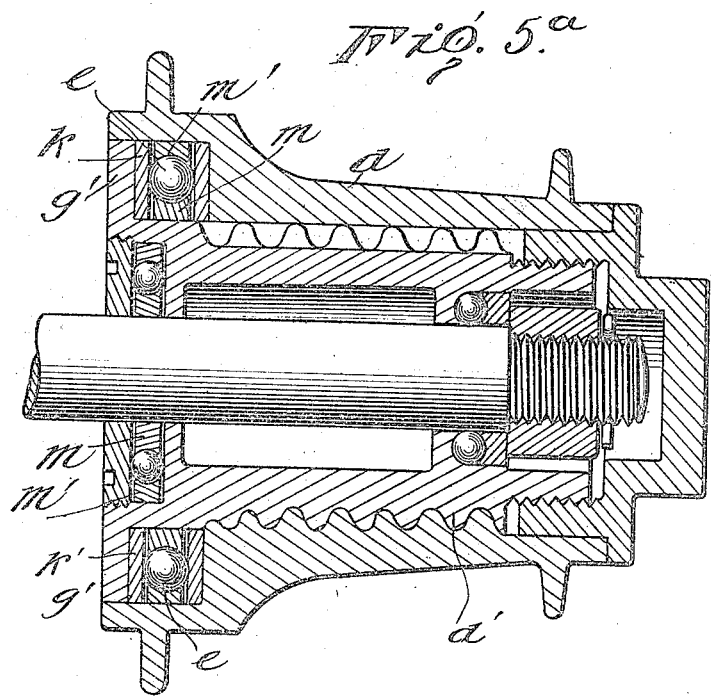
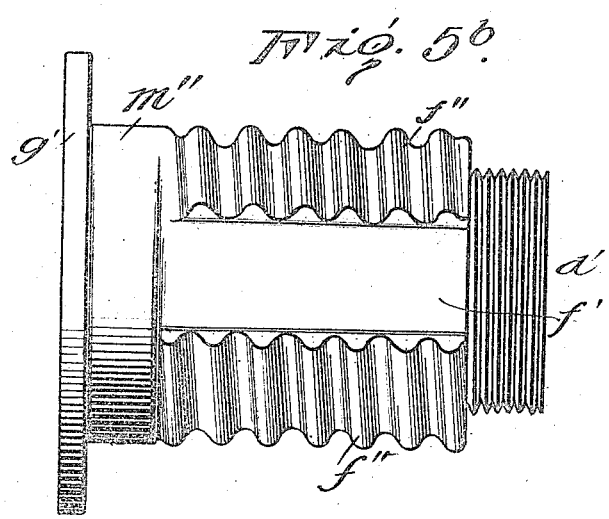

JEAN NEY, OF PARIS, FRANCE.

DETACHABLE AND INTERCHANGEABLE HUB FOR WHEELS OF ALL KINDS.

1,247,991. Specification of Letters Patent. Patented Nov. 27, 1917.

Application filed April 7, 1913. Serial No. 759,453.

*To all whom it may concern:*

Be it known that I, JEAN NEY, a citizen of the Republic of France, residing at Paris, Seine 12 Rue Juliette Dodu, have invented certain new and useful Improvements in Detachable and Interchangeable Hubs for Vehicle-Wheels of All Kinds, of which the following is a full, clear, and exact description.

This invention relates to detachable and interchangeable hubs for the wheels of vehicles, and particularly for pneumatic wheels. The hub, according to the present construction, consists of two members one of which is rotatably secured on the wheel axle, and the other member carrying the spokes and other parts of the wheel so that in case of accident or damage to a wheel it can be easily removed, and another wheel of the same type can be substituted for it.

In making this exchange, the parts of the wheel proper, are not disturbed in their relation to each other, and the operation is performed very quickly.

Other inventions having this purpose in view, generally have this disadvantage, that when the wheel has once been mounted it is very difficult to remove it owing to rust or dirt, or the fastening or the wheel is not sufficiently secure and the parts become disconnected when strained.

By this invention, the entire wheel except the member fixed on the axle, may at any time, be easily removed and another wheel be mounted in its place.

The accompanying drawings illustrate the device, in which Figure 1 is a longitudinal section of the fixed part of a hub, for a front wheel, in accordance with my invention. Fig. 2 is a similar view of the removable part of the hub.

Figs. 3, 3$^a$ and 4 show details of parts of the device.

Fig. 5$^a$ is a longitudinal section showing the inner hub member positioned within the outer hub member, as shown in Fig. 5.

Fig. 5$^b$ is an elevation of the inner hub member, as shown in Fig. 5$^a$.

Figs. 5 and 6, show modifications of the invention.

The fixed part $a$, of the hub is provided with recesses $b$, for the ball bearings not shown in the drawings. Its exterior is threaded at $c$ with one or more square or round threads. The member $d$ is provided with flanges or cheeks $e$, between which the spokes of the wheel are inserted. It is provided also in its interior with screw threads $f$, corresponding to the threads $c$ on the fixed member so that the part $d$, can be screwed on to the part $a$.

A stop $g$ limits the screwing together of the parts $a$, and $d$, and these parts which are prevented from unscrewing by the ring $h$, which thus connects together the two parts of the hub.

The cap $j$ is then screwed home and closes the hub against the entrance of foreign matter.

The guarantee against the accidental unscrewing of the hub is owing to the difference of the pitch of the respective threads of the screws.

The hubs according to the present invention may be mounted at either the right or the left side of the vehicle, thus the direction of rotation of the wheel is not material.

In using this wheel the part $a$ being already secured on the axle, the part $d$ is screwed on to the part $a$, then the ring $h$ is screwed on and blocked by means of a key and grooves $h^1$, and finally the cap is screwed on, to bind all together.

This kind of a hub may be employed for any system of wheels with wooden or wire spokes, tangent wheels and the like.

For the back, or motor wheels the part $a$ is provided with a sprocket crown, brake drum and other devices usually employed for mounting and operating motor wheels.

The modification shown in Figs. 5 and 6, is for the purpose of rapidly mounting and dismounting the wheel and preventing any jamming of the members together.

The part $d$ has its thread $f$ as shown in Figs. 1 and 2, and is provided with three grooves $f^1$. The screw threading of the part forming the body with the journal (not shown in the drawing) is also provided with corresponding grooves, so that for mounting and dismounting the movable part is slipped on to the fixed part by causing the grooves to coincide with the screw threads. As soon as the wheel has been pushed home a slight turn of $\frac{1}{3}$, or $\frac{1}{4}$ revolution permits of locking the wheel without having to screw it throughout the length of the threads.

A thrust bearing is also arranged in this invention.

A thrust bearing is provided to relieve undue friction between the inner hub member *d'* and the outer hub member *d*, during the assembling of the parts and to facilitate the unlocking thereof, when it is desired to take them apart. The bearing consists of a pair of concentric race members *m* and *m'*, positioned on the surface *m''*, of the inner hub member *d'*, and between a pair of rings *k*, in which are arranged any desired number of ball bearings *l*. The thrust bearing, thus formed, is clamped in position, within the enlarged annular channel or recess *b*, (as shown in Figs. 5 and 5ª) by means of the flange *g'*, of the inner hub member *d'* (as shown in Fig. 5ª).

Having now described the invention, what I claim and desire to secure is—

1. A vehicle hub comprising an inner hub member, an outer hub member disposed on said inner hub member and interlocked therewith, a jam nut for locking said members against accidental displacement one from the other, and a ball bearing interposed between said members, whereby to reduce the friction to a minimum to facilitate the dismounting of the outer hub member from said inner hub member.

2. In a vehicle hub, the combination with an inner hub member, of an outer hub member threaded onto said inner hub member, a jam nut threaded onto said inner hub member and abutting said outer hub member for retaining the latter from displacement, and an anti-friction bearing interposed between said inner hub member and said outer hub member, whereby to facilitate the dismounting of the parts.

3. In a vehicle hub, the combination with an inner hub member, of an outer hub member mounted on said inner hub member, corresponding interrupted threaded sections formed on the opposed surfaces of the said members to facilitate the assembling and dismounting of one member with respect to the other, a jam nut threaded onto the inner hub member and abutting said outer member for retaining the latter against accidental displacement, and an annular ball bearing interposed between opposed end portions of the said members, whereby to facilitate the dismounting of the parts when desired.

In testimony whereof I affix my signature.

JEAN NEY.

In the presence of—
GEORGES VILLEBESSEYX,
HANSON C. COXE.

Copies of this patent may be obtained for five cents each, by addressing the "Commissioner of Patents, Washington, D. C."